United States Patent
McKay

(10) Patent No.: US 9,237,180 B2
(45) Date of Patent: Jan. 12, 2016

(54) SYSTEM AND METHOD FOR VERIFYING CONFIGURATION ITEM CHANGES

(71) Applicant: CA, Inc., Islandia, NY (US)

(72) Inventor: Peter McKay, Brooklyn, NY (US)

(73) Assignee: CA, Inc., New York, NY (US)

( * ) Notice: Subject to any disclaimer, the term of this patent is extended or adjusted under 35 U.S.C. 154(b) by 209 days.

(21) Appl. No.: 13/836,506

(22) Filed: Mar. 15, 2013

(65) Prior Publication Data

US 2014/0280268 A1  Sep. 18, 2014

(51) Int. Cl.
*G06F 17/30* (2006.01)
*H04L 29/08* (2006.01)

(52) U.S. Cl.
CPC .......... *H04L 67/00* (2013.01); *G06F 17/30286* (2013.01)

(58) Field of Classification Search
None
See application file for complete search history.

(56) References Cited

U.S. PATENT DOCUMENTS

| | | | |
|---|---|---|---|
| 2005/0256740 A1* | 11/2005 | Kohan et al. | 705/2 |
| 2007/0100712 A1 | 5/2007 | Kilpatrick et al. | |
| 2008/0126439 A1 | 5/2008 | Kaminsky | |
| 2008/0281833 A1 | 11/2008 | Cain et al. | |
| 2009/0037481 A1 | 2/2009 | Baker | |
| 2011/0016368 A1 | 1/2011 | Ayachitula et al. | |
| 2011/0055165 A1* | 3/2011 | McKay | 707/682 |
| 2011/0087427 A1 | 4/2011 | Liu | |

\* cited by examiner

*Primary Examiner* — Syed Hasan
(74) *Attorney, Agent, or Firm* — Myers Bigel Sibley & Sajovec, P.A.

(57) ABSTRACT

A system and method is provided for managing verification of configuration item changes. Discovered configuration data associated with a configuration item may be received. A determination may be made regarding whether a change order for the configuration item exists. A determination may be made regarding whether the change order is in a "verification in progress" state. When the change order is in the "verification in progress" state, alignment of the discovered configuration data with the change order may be determined and a verification policy may be determined based on the determined alignment.

23 Claims, 9 Drawing Sheets

Discovered data

| source Identification | target CI identification | attribute name | attribute value |
|---|---|---|---|
| discoverer1 | server1 | disk space | 100 GB |
| discoverer1 | server2 | cost | $1000 |

Managed Attribute Data

| attribute name |
|---|
| disk space |

Policy data

| priority | source Identification | target CI identification | attribute name | action |
|---|---|---|---|---|
| 1 | * | * | disk space | update if matches change order |

Change Order data

| change order id | target CI identification | attribute name | attribute value |
|---|---|---|---|
| 12345 | server1 | disk space | 100 GB |

CMDB (configuration management database) data

| CI Identification | disk space | cost |
|---|---|---|
| server1 | 10gb | |

Resulting CMDB data

| CI Identification | disk space | cost |
|---|---|---|
| server1 | 100GB | |
| server2 | | $1000 |

FIG. 9

SYSTEM AND METHOD FOR VERIFYING CONFIGURATION ITEM CHANGES

BACKGROUND

The present disclosure relates to the field of configuration management. More particularly, the present disclosure relates to verifying configuration item changes in a configuration management system.

Managing changes to elements of an enterprise (referred to as, "configuration items") is typically performed using a change management system. The change management system uses change orders that contain details of a change to be made to a configuration item. Change orders are put through a change order lifecycle during which change is authorized, executed and verified. A change order usually contains the details of a change stored in free form, national language text, which is for all intents and purposes difficult to parse. If the details are unparseable, the change itself cannot be programmatically verified.

BRIEF SUMMARY

According to one aspect of the present disclosure, a method for managing verification of configuration item changes comprises receiving discovered configuration data associated with a configuration item, determining whether a change order exists for the configuration item, when a change order exists for the configuration item, determining whether the change order is in a verification in progress state, when the change order is in the verification in progress state, determining alignment of the discovered configuration data with the change order, wherein said determining the alignment further comprises determining whether a variance exists between the discovered configuration data and the change order; and determining a verification policy based on the determined alignment.

BRIEF DESCRIPTION OF THE DRAWINGS

Aspects of the present disclosure are illustrated by way of example and are not limited by the accompanying figures with like references indicating like elements.

FIG. 9 illustrates an example for verifying and managing configuration item changes, according to various aspects of the present disclosure.

DETAILED DESCRIPTION

Figure 1:
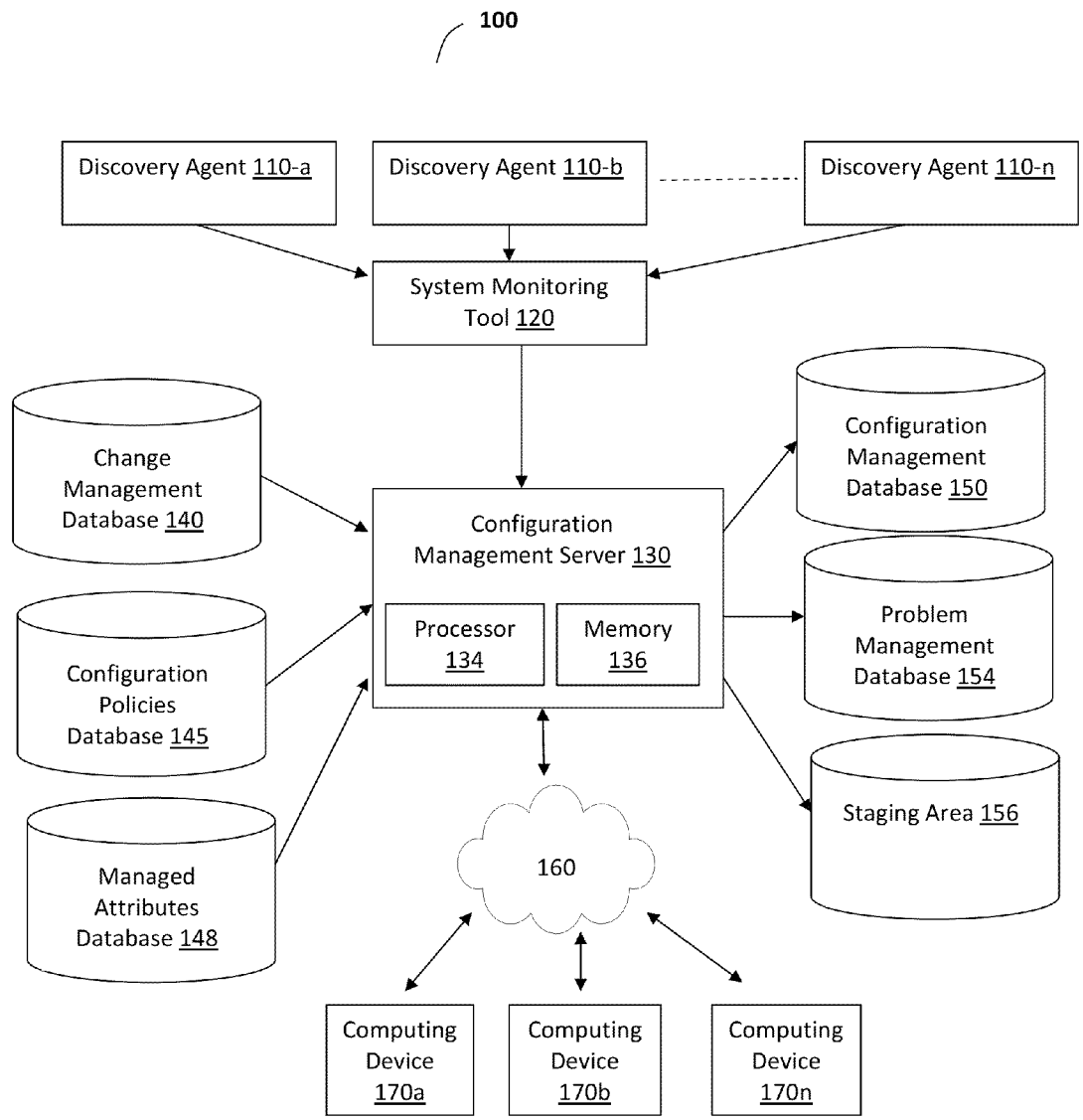
FIG. 1 illustrates an example configuration management system, according to various aspects of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing Computer program code for carrying out operations for aspects of the present disclosure may be written in any combination of one or more programming languages, including an object oriented programming language such as Java, Scala, Smalltalk, Eiffel, JADE, Emerald, C++, CU, VB. NET, Python or the like, conventional procedural programming languages, such as the "C" programming language, Visual Basic, Fortran 2003, Perl, COBOL 2002, PHP, ASAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an example illustration of configuration management system 100, according to an aspect of the present disclosure. System 100 may include, among other things, a configuration management server 130 that is configured to receive configuration data associated with one or more configuration items that it manages. A configuration item may be an object/resource which is being managed (or is to be managed) in an enterprise and an attribute associated with a managed configuration item may be a managed attribute. A configuration item may represent various types of objects/resources which may include, but not be limited to, hardware, software, services, users, business units, service level agreements, organizations, and/or other objects/resources associated with the enterprise.

A configuration item ("CI") may have one or more attributes associated with it. All the attributes of a CI with their associated values define a complete state of the CI at a given point in time. The attributes of a CI may include, but not be limited to, type of configuration item, MAC address, IP address, status, vendor information, component information, acquire date, category, model name, lease information, relationship with other CIs, and/or other items that define the configuration item. For example, attributes associated with a server CI may include component attributes such as disk space, memory, processor type and/or other attributes. Relationship attributes may define directional relationships between CIs. Relationship attributes may define various relationship types, for example, provider to dependent, dependent to provider, peer-to-peer, and/or other relationship types. Relationships between CIs may include, is approved by, is authorized by, is owned by, connects to, is contained by, is controlled by, is hosted by, is used by, monitors, and/or other relationships.

In some implementations, information associated with the configuration items maybe stored in a configuration management database (CMDB) 150. CMDB 150 may include information about an authorized state of each managed configuration item. A configuration item in CMDB 150 may be represented as a set of identifying and non-identifying properties organized in key/value pairs (attribute data). For example, the identifying properties may include name: server 1; IP address: 1.2.3.4; or MAC address: 11.22.33.44 and the non-identifying properties may include disk space: 500 GB; or architecture: Intel; etc.

Discovery agents 110-*a*, 110-*b*, . . . , and 110-*n* discover information about the configuration items (referred to as, configuration data) and communicate the discovered configuration data to system monitoring tool 120. The configuration data may include data regarding one or more attributes associated with the configuration items. In some implementations, the configuration data may include a plurality of attribute name/attribute value pairs associated with each configuration item. In some implementations, a discovery agent 110-*a*, 110-*b*, . . . , or 110-*n* may produce one or more attribute name/attribute value pairs for one or more configuration items. For example, configuration data associated with a server CI may include attribute name/attribute value pairs, such as, disk space/100 GB, cost/$1000, and/or other pairs. In some implementations, the configuration data may include configuration item identification (CI ID), discovery agent (or source) identification (DA ID), and/or attribute name/attribute value pair information associated with a plurality of configuration items. Configuration item identification may include an identifier identifying the target configuration item for which the configuration data is gathered and on which any changes (associated with the discovered data and/or change order) have been performed. Discovery agent identification includes an identifier identifying the discovery agent that gathers the configuration data (or source of the configuration data) associated with the identified configuration item.

In some implementations, a configuration item may run a discovery agent 110-*a*, 110-*b*, . . . , or 110-*n* that discovers/gathers the appropriate configuration data and sends the gathered data to system monitoring tool 120. In some implementations, discovery agents may be run on the configuration management server 130, and in some cases be run in a distributed fashion on the configuration item and the configuration management server.

In some implementations, a transaction may be defined as a set of attribute name/attribute value pairs, which are asynchronously created by a discovery agent 110-*a*, 110-*b*, . . . , or 110-*n*. In some implementations, a transaction may be defined as a collection of attribute name/attribute value pairs representing an update/change to a CI and its relationships. In some implementations, a transaction may be defined as a collection of configuration item identification/attribute name/attribute value pairs logically grouped together by the discovery agent. In some implementations, a single transaction may partially or completely satisfy one or more change orders. In some implementations, a transaction may include, among other things, target CI identification, data source identification, attribute name, attribute value, and/or other information.

In some implementations, system monitoring tool 120 collects the configuration data/transaction data from each discovery agent 110-*a*, 110-*b*, . . . , and 110-*n*. In some implementations, system monitoring tool 120 may communicate the discovered configuration data/transaction data to configuration management server 130.

In some implementations, configuration management server 130 may determine whether any change orders exist for a configuration item for which configuration data/transaction data has been discovered. In some implementations, configuration management server 130 may query a change management database 140 to make the determination.

In some implementations, a change order (also known as, change ticket or change request) may refer to a request for a change to a configuration of a configuration item. In some implementations, a change order contains a request for a change to be implemented. In some implementations, the change order may specify the CI targets for the change as well as a set of attribute name/value pairs describing the nature of the change. In some implementations, a change order associated with a configuration item may include a change order identifier, a configuration item identifier (CI ID), change order state, change order specification, and/or other information. In some implementations, a change order identifier may include a unique identifying sequence number. In some implementations, CI ID may include an identifier identifying the target configuration item for which the change order is created (i.e., the configuration item whose configuration is to be changed/modified based on the change order). In some implementations, change order state may include an overall state of he change order expressed in the form of one or more change order attributes such as, approval status of the change order, the scheduled implementation date of the change associated with the change order, the implementation status of the change order (e.g., initial, approved, scheduled, currently being implemented, currently being verified, cancelled, complete, etc), and/or other change order attributes. In some implementations, the change order specification may include specifications for a desired change, specified down to the attribute level. In some implementations, the change order specification may include details of change(s) to be performed. The details may include description of the attributes to be changed, description of the desired values of those attributes, status of the change order specification (e.g., verification in progress, implementations, requires manual intervention, etc.), and/or other details.

Figure 3:
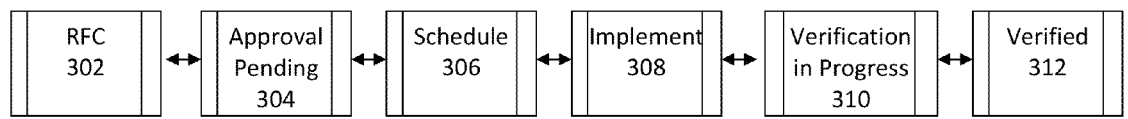
FIG. 3 illustrates an example change order lifecycle, according to various aspects of the present disclosure.

In some implementations, a change order may have a life-cycle associated with it, which may be reflected in the state, as shown in FIG. 3, for example. During the RFC (request for change) state 302, a change order may be created, wherein the change order specification may be set. In the approval pending state 304, the change order may be reviewed by an authoritative person of the enterprise (i.e., a person having the authority to approve or reject a change associated with the change order) and may be either approved or rejected. In a schedule state 306, an approved change order may be provided with an implementation schedule. In an implementation state 308, the change specified in the change order may be implemented/executed based on the date/time specified in the implementation schedule. In a "verification in progress" state 310, the change order (changes in the change order) is ready to be verified. The change order may be ready for verification when the change specifications in the change order have been implemented/executed. In a verified state 312, all changes in the change order may be verified and the configuration item is in the state indicated by all the change specifications. In other words, the configuration item state (i.e., all the attributes of a CI with their associated values) is updated based on the verified changes.

In some implementations, the change order specification may only be set in the RFC state 302 and may not be modified once the change order has progressed beyond the approval pending state 304. In some implementations, the verification of the change order/changes may take place only in the verification in progress state 310, and during this time, the change order specification being verified is locked and cannot be changed.

In some implementations, multiple change order specifications may exist for a single configuration item, in a plurality of different change orders. At a single point in time, a plurality of change specifications may exist for a single CI, wherein each change specification may specify a different attribute name. In some implementations, single CI may have multiple independent change orders associated with it, each change order having a different implementation status. Each change order may be independent from any other and may be independently managed.

In some implementations, change orders may be stored in change management database 140. In some implementations, configuration management server 130 may retrieve one or more change orders associated with a configuration item for which configuration data/transaction data has been discovered. In some implementations, configuration management server 130 may extract the configuration item identifier of the configuration item from the discovered configuration data associated with the configuration item. In some implementations, configuration management server 130 may query the change management database 140 based on the configuration item identifier to determine whether any change orders exist for the configuration item. In some implementations, in response to a determination that the extracted configuration item identifier matches a configuration item identifier contained in a change order stored in change management database 140, a determination may be made that a change order associated with the configuration item exists. In some implementations, configuration management server 130 may retrieve the change order associated with the configuration item from the change management database 140 in response to a positive match. In some implementations, in response to a determination that the extracted configuration item identifier does not match a configuration item identifier contained in a change order stored in change management database 140, a determination may be made that a change order associated with the configuration item does not exist. In some implementations, configuration management database 140 may generate a notification indicating that no change order exists for the configuration item in response to a negative match.

In some implementations, in response to a determination that one or more change orders for the configuration item exist in the change management database 140, configuration management server 130 may determine a status of the determined one or more change orders. For example, configuration management server 130 may determine that a change order is in a "verification in progress" state, or "implementation" state, or any other state.

In some implementations, configuration management server 130 may determine alignment of discovered configuration data with a change order that is in the "verification in progress" state (referred to hereinafter as "change order alignment"). In some implementations, change order alignment indicates how closely discovered attribute data is aligned (or matches) with one or more change orders. In some implementations, change order alignment indicates whether a variance exists between the discovered configuration/transaction/attribute data and the one or more change orders. In some implementations, configuration management server 130 may compare the discovered configuration data/transaction data against a change order in the "verification in progress" state to determine change order alignment.

In some implementations, configuration management server 130 may determine at least one verification policy to be used based on the discovered configuration data and/or the change order alignment. In some implementations, the verification policies may describe conditions for updating configuration management database 150, and/or any actions to be taken whenever an update to a configuration of a configuration item in the configuration management database 150 is attempted. In some implementations, configuration management server 130 may query configuration policies database 145 based on the discovered configuration data and/or the change order alignment. In some implementations, configuration management server 130 may retrieve the at least one verification policy from configuration policies database 145 and execute the retrieved verification policy.

In some implementations, configuration management server 130 may be communicatively coupled to databases 140, 145, 148, 150, 154, and staging area 156. Configuration management server 130 may be communicatively coupled to a computing device 170 (illustrated in FIG. 1 as a plurality of computing devices 170a . . . 170n). Configuration management server 130 may be coupled to computing device 170 via a network 160. Network 160 may include a Local Area Network, a Wide Area Network, a cellular communications network, a Public Switched Telephone Network, and/or other network or combination of networks.

In some implementations, configuration management server 130 may include a processor 134, a memory 136, and/or other components that facilitate the functions of configuration management server 130. In some implementations, processor 134 includes one or more processors or microprocessors configured to perform various functions of configuration management server. In some implementations, memory 136 includes one or more tangible (i.e., non-transitory) computer readable media. Memory 136 may include one or more instructions that when executed by processor 134 configure processor 134 to perform functions of configuration management server 130. In some implementations, memory 136 may include one or more instructions stored on tangible computer readable media that when executed at a remote device, such as computing device 170, cause the remote device to interact or communicate with configuration management server 130, as described herein.

Figure 2:
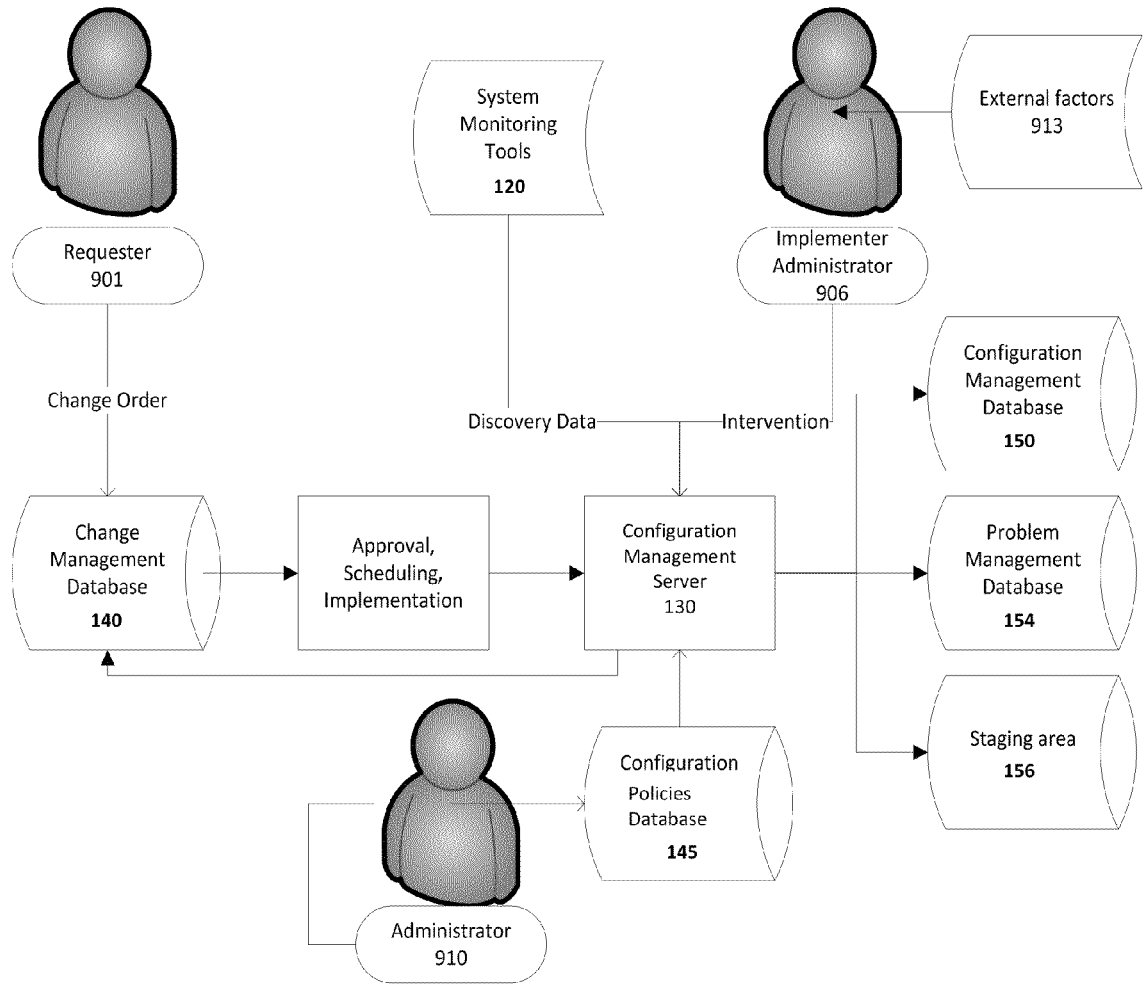
FIG. 2 illustrates an example flow of data among various entities involved in the verification of configuration item changes, according to various aspects of the present disclosure.

FIG. 2 illustrates an example flow of data among various entities involved in the verification of configuration item changes, according to an aspect of the present disclosure. A requester 901 (authorized user or other authorized entity) may provide a request to create a change order to effect one or more changes on one or more configuration items. Configuration management server 130 may receive a request to create a change order from requester 901 via computing device 170a, 170b, . . . , 170n (depicted in FIG. 1, for example). Configuration management server 130 may create the change order in response to the request and store the created change order in change management database 140. The change order may be subsequently approved, scheduled and implemented.

In some implementations, system monitoring tool 120 may communicate discovered configuration data to configuration management server 130. In some implementations, system monitoring tool 120 may communicate the discovered configuration data after the implementation of the change order is complete.

In some implementations, configuration management server 130 may determine alignment of discovered configuration data with the change order. In some implementations, configuration management server 130 may compare the discovered configuration data against the change order to determine change order alignment. In some implementations, configuration management server 130 may perform the comparison against the change order in response to a determination that the change order is in the "verification in progress" state.

In some implementations, the configuration management server 130 may compare discovered data (name and/or value) of an attribute (included in the discovered configuration data associated with a configuration item) with desired data (name and/or value) of the attribute included in the change order specification associated with the change order for the configuration item. In some implementations, configuration management server 130 determines alignment of the discovered configuration data with the change order based on the comparison.

In some implementations, comparing desired attribute values with discovered attribute value may be a complex process due to inconsistency between various data sources. For example, in each of the cases depicted in the table below, the desired value in the change specification does not exactly match the discovered value.

| change order specification attribute | change order specification value (desired) | discovered value | note on why comparison would fail |
|---|---|---|---|
| disk space | 10 GB | 10 gb | case sensitivity |
| disk space | 10 GB | 10,000 MB | inconsistent units |
| windows version | Windows/xp | windows/xp patch 1234 | additional info. suffix |
| windows version | XP | windows/xp patch 1234 | additional info. prefix/suffix |

In order to match the desired values in the change specification with the discovered value, the discovered data may be transformed or other comparison methods may be used. The comparison methods may be attribute specific and may be stored in the managed attributes database 148 that includes information describing each managed attribute.

In some implementations, configuration management server 130 may retrieve one or more verification policies from the configuration policies database 145 in response to the determined change order alignment. In some implementations, the verification policies may be created by an administrator 910 via computing device 170*a*, 170*b*, ..., 170*n*. Computing device 170*a*, 170*b*, ..., 170*n* may be configured to store the verification policies in configuration policies database 145.

In some implementations, configuration management server 130 may execute the verification policies. The verification policies may describe actions to be taken by the system. For example, an action may include update the configuration management database 150, update the problem management database 154, write discovered configuration data to a staging area 156 for later processing, and/or other actions.

In some implementations, configuration management server 130 may update the change management database 140 to reflect the progress of the change order. For example, when all changes in the change order have been verified and the CI is in the state indicated by all the change specifications in the change order, the change order state may be "verified". Configuration management server 130 may update the change management database 140 by modifying the state of the change order from "verification in progress" to "verified".

In some implementations, based on external factors 913, authorized personnel 906 may alter the status of various components of the system. For example, authorized personnel may completely or partially cancel a change order. For example, a current change order may be deemed impossible to satisfy based on availability of components or of other resources. This may be because another previous change order which was expected to be completed may not have completed on time, or a shipment or task may have failed and the current change order needs to be postponed. In this case, authorized personnel 906 may intervene and set the change order status to "cancelled". In some implementations, this may cause all pending change specification verifications associated with the current change order to be cancelled. In some implementations, if there are no pending change specifications for the current change order, the current change order may be optionally promoted to the next state of the change order lifecycle.

Figure 4:
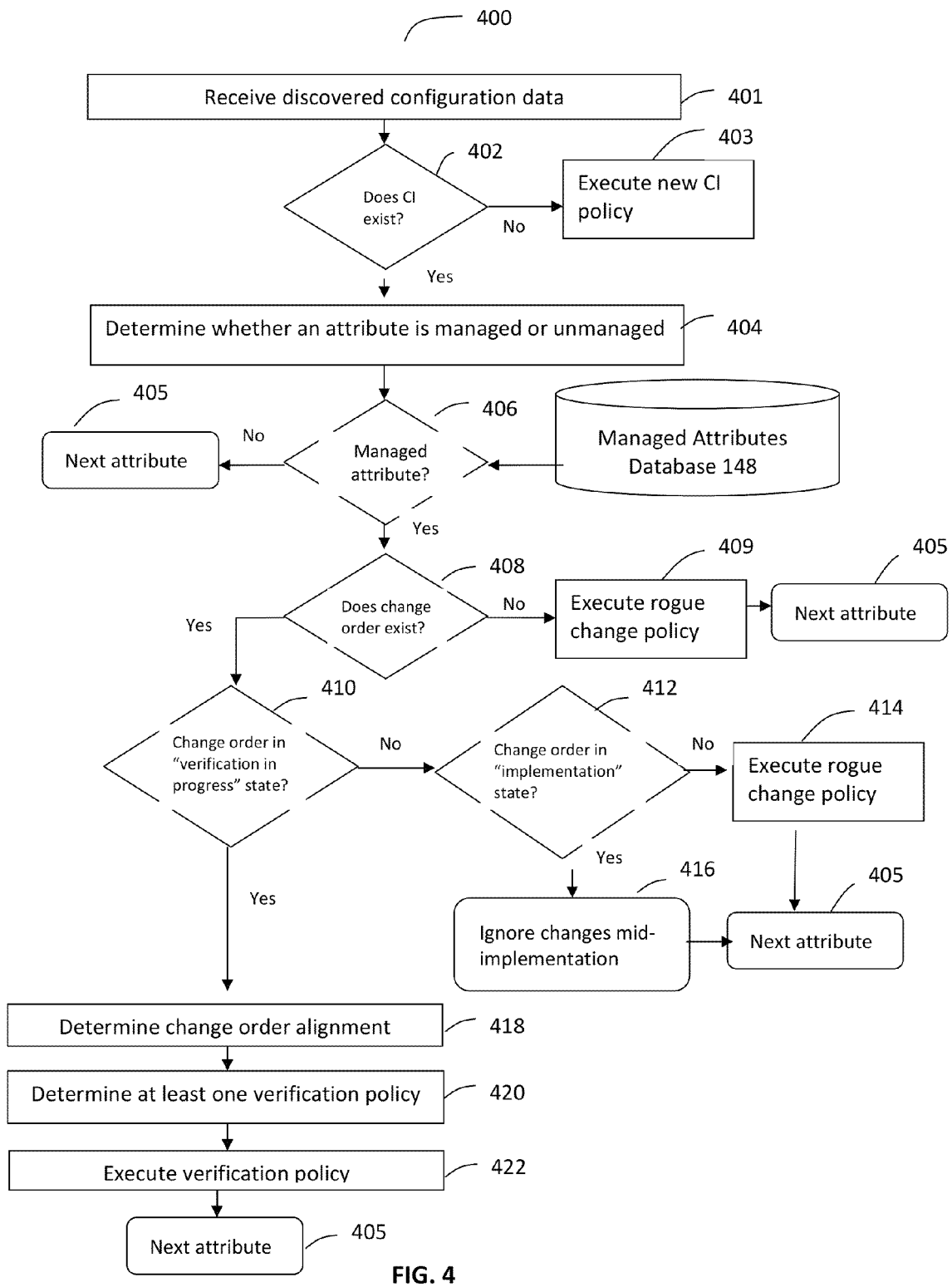
FIG. 4 illustrates a flowchart depicting example operations performed by system 100/configuration management server 130 to verify configuration item changes, according to various aspects of the present disclosure.

FIG. 4 is a flowchart 400 depicting example operations performed by system 100/configuration management server 130 to verify configuration item changes, according to various aspects of the present disclosure. In some implementations, the described operations may be accomplished using one or more of the modules/components described herein. In some implementations, various operations may be performed in different sequences. In other implementations, additional operations may be performed along with some or all of the operations shown in FIG. 4. In yet other implementations, one or more operations may be performed simultaneously. In yet other implementations, one or more operations may not be performed. Accordingly, the operations described should not be viewed as limiting.

In an operation 401, process 400 may receive discovered configuration data. In some implementations, process 400 may receive the discovered configuration data from system monitoring tool 120. The discovered configuration data may include data gathered by a plurality of discovery agents 110-*a*, 110-*b*, ..., 110-*n*.

In some implementations, each attribute in the discovered data is independently processed, allowing for independent verification of each change specification. For example, user A may request creation of change order 1, specifying CI server1 to have a 500 GB hard drive and 8 GB of memory. User B may request creation of change order 2, specifying CI server1 to have an IP address of 1.2.3.4. If both change order 1 and change order 2 are in the "verification in progress" state, each change may be separately managed and verified.

In some implementations, in an operation 402, process 400 may determine whether a record associated with a configuration item (associated with the discovered configuration data (attribute data)) exists in the configuration management database 150. In some implementations, process 400 may extract a configuration item identifier of a configuration item from the discovered configuration data. In some implementations, process 400 may query the configuration management database 150 based on the configuration item identifier to determine whether the record associated with the configuration item exists in the configuration management database. In some implementations, in response to a determination that the extracted configuration item identifier matches a configuration item identifier in the configuration management database 150, process 400 may determine that a record for the configuration item exists and proceed to operation 404. In some implementations, in response to a determination that the extracted configuration item identifier does not match a configuration item identifier in the configuration management database 150, process 400 may determine that a record for the configuration item does not exist and that the configuration item is a "new CI". For example, when no record for the configuration item exists in the configuration management database 150, and the data associated with the configuration item is discovered for the first time, the configuration item may be a "new CI". For example, the discovery agent discovered a CI server 2, but no record for server 2 exists, which may represent a security threat or a failed inventory system. In some implementations, in response to a determination that data associated with a "new CI" has been discovered, process 400 may execute a "new CI" verification policy, in an operation 403.

In some implementations, in an operation 404, process 400 may determine whether a discovered attribute (i.e., attribute in the discovered configuration data) is managed or unmanaged. In some implementations, system 100 may include a managed attributes database 148 which stores a list of all managed attributes. In some implementations, process 400 may query the managed attributes database 148 to determine whether a discovered attribute is in the list of managed attributes, in an operation 406. In response to a determination that the discovered attribute is in the list of managed attributes, process 400 may determine that the discovered attribute is a managed attribute and proceed to operation 408. In response to a determination that the discovered attribute is not in the list of managed attributes, configuration management server 130 may determine that the discovered attribute is an unmanaged attribute. In some implementations, the unmanaged attribute may be ignored and the next discovered attribute in the discovered configuration data is processed, in operation 405 (where the processing of the next attribute spans one or more operations of FIG. 4 starting from operation 404).

In some implementations, in an operation 408, process 400 may determine whether at least one change order exists for a configuration item for which configuration data/transaction data has been discovered. In some implementations, process 400 may query a change management database 140 to make the determination. In some implementations, process 400 may extract the configuration item identifier of the configuration item from the discovered configuration data associated with the configuration item. In some implementations, process 400 may query the change management database 140 based on the configuration item identifier to determine whether at least one change order exists for the configuration item. In some implementations, in response to a determination that the extracted configuration item identifier matches a configuration item identifier contained in a change order stored in change management database 140, a determination may be made that a change order associated with the configuration item exists. In some implementations, process 400 may retrieve the change order associated with the configuration item in response to a positive match and proceed to operation 410. In some implementations, in response to a determination that the extracted configuration item identifier does not match a configuration item identifier contained in a change order stored in change management database 140, a determination may be made that a change order associated with the configuration item does not exist. In some implementations, in response to a determination that a change order does not exist, process 400 may determine that any changes associated with the discovered attribute are a result of a "rogue change". In some implementations, in response to a determination that a "rogue change" has occurred, process 400 may execute a rogue change policy, in an operation 409 and the next attribute may be processed, in operation 405.

In some implementations, in an operation 410, process 400 may determine a state or status of the change order. In some implementations, process 400 may determine whether the change order is in the "verification in progress" state. In some implementations, in response to a determination that the change order is in the "verification in progress" state, process 400 may determine alignment of discovered configuration data with a change order that is in the "verification in progress" state, in an operation 418. In some implementations, process 400 may determine whether a variance exists between the discovered configuration data and the change order.

In some implementations, a variance occurs when discovered configuration data does not match or cannot be matched to a change order. Various types of variances may occur. A first type of variance may include "incorrectly implemented or executed change". In this case, a discovered value for an attribute does not match a desired value for the attribute in the change order. For example, the change order requested CI server 1 to have a 500 GB hard drive, but the discovery agent discovered a 100 GB hard drive. A second type of variance may include a "rogue change". In this case, the discovery agent discovered a change to an attribute name, where no corresponding change order specification exists for the attribute. A third type of variance may include "unverifiable change order". In this case, change specifications of the change order may be described in such a way that they cannot be programmatically converted to attribute name/attribute value pairs. For example, instead of defining a change order in a structured format such as, [CI: server 1; attribute name: disk space; attribute value: 500 GB], the change order may be described in prose such as, "please upgrade server 1 hard drive to 500 GB," or "please double the size of the hard drive on server 1". Other types of variances may occur.

Figure 5:
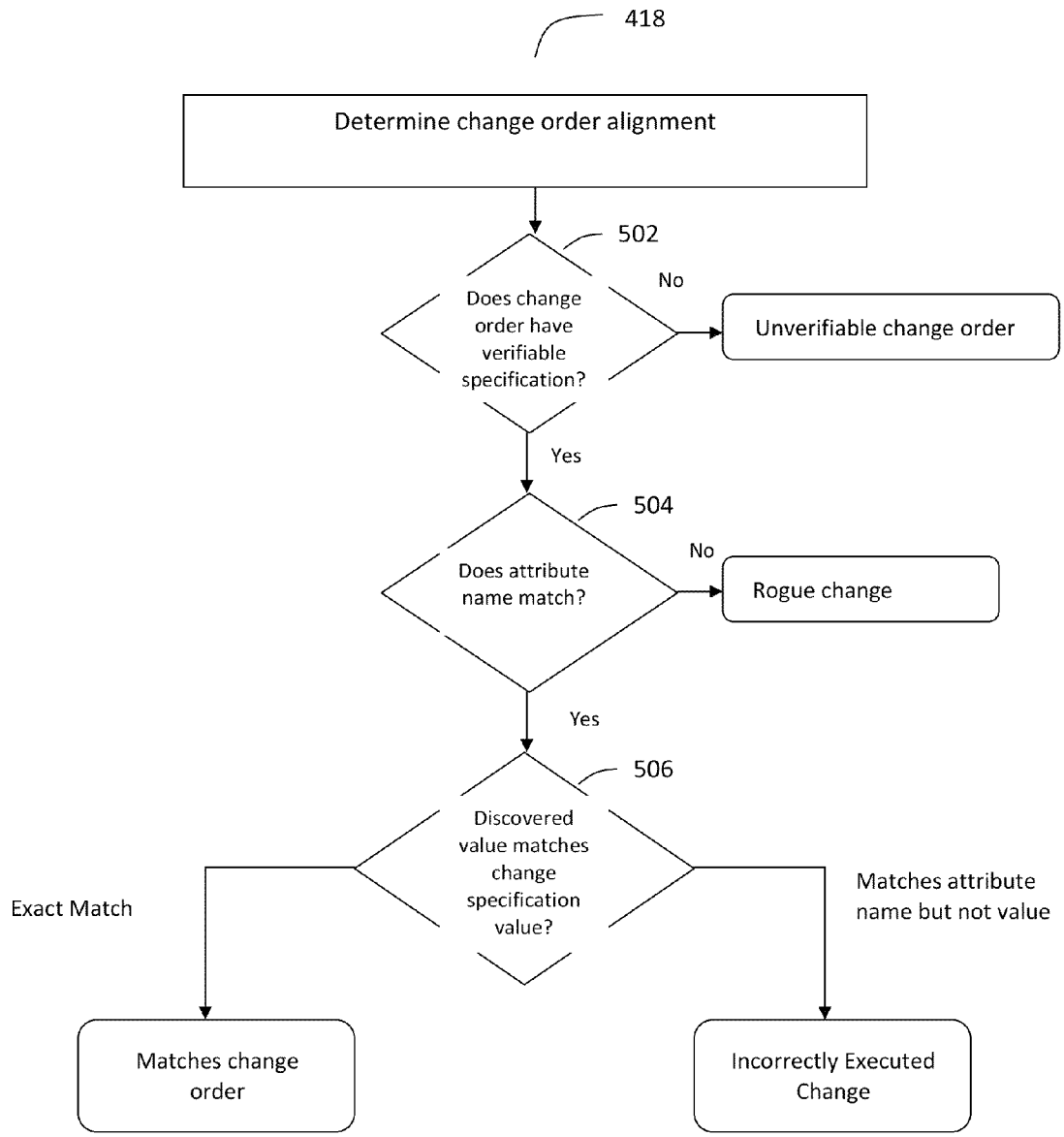
FIG. 5 illustrates a flowchart depicting example operations performed to determine change order alignment, according to various aspects of the present disclosure.

In some implementations, FIG. 5 illustrates a flowchart depicting example operations performed to determine change order alignment (operation 418 of process 400) in detail, according to various aspects of the present disclosure. In some implementations, process 400 may determine whether the change order has a verifiable change specification (i.e., a change specification that can be programmatically converted into attribute name/attribute value pairs), in an operation 502.

In some implementations, in response to a determination that the change order does not have a verifiable change specification, a determination may be made that a variance exists between the discovered configuration data and the change order and a type the variance. In some implementations, a type of variance may be determined to be "unverifiable change order".

In some implementations, in response to a determination that the change order has a verifiable change specification, process 400 may compare discovered data (e.g., name and/or value) of the managed attribute (included in the discovered configuration data associated with a configuration item) with a desired data (desired name and/or desired value) of the attribute included in the change order specification associated with the change order for the configuration item. In some implementations, in response to a determination that the discovered data does not match the desired data, process 400 may determine that a variance exists between the discovered configuration data and the change order and may determine a type of the variance.

In some implementations, process 400 may determine whether a discovered name of the managed attribute matches a desired name of the attribute, in an operation 504. In some implementations, in response to a determination that the discovered name does not match the desired name, a type of variance that exists between discovered configuration data and the change order may be determined to be "rogue change".

In some implementations, in response to a determination that the discovered name of the managed attribute matches the desired name of the attribute, process 400 may determine whether the discovered value of the managed attribute matches the desired value of the attribute, in an operation 506. In some implementations, in response to a determination that the discovered value does not match the desired value, a type of the variance that exists between discovered configuration data and the change order may be determined to be "incorrectly implemented or executed change".

In some implementations, in response to a determination that the discovered value matches the desired value, a determination may be made that the discovered configuration data matches the desired data of the change order and that no variance exists between the discovered configuration data and the change order.

As such, the change order alignment may indicate that discovered data is part of a rogue change, discovered data matches the change order exactly, discovered data indicates an incorrectly implemented change, or unverifiable change orders exist for the CI.

Referring back to FIG. 4, process 400 may determine at least one verification policy to be used based on the discovered configuration data and/or the change order alignment, in an operation 420. In some implementations, the verification policies may describe conditions for updating configuration management database 150, and/or actions to be taken whenever an update to a configuration of a configuration item in the configuration management database is attempted. In some implementations, process 400 may query configuration policies database 145 based on the discovered configuration data and/or the change order alignment. In some implementations, process 400 may retrieve the at least one verification policy from configuration verification policies database 145, In some implementations, process 400 may execute the retrieved verification policy, in an operation 422 and proceed to operation 405 where the next discovered attribute is processed (where the processing of the next attribute spans one or more operations of FIG. 4 starting from operation 404).

In some implementations, in response to a determination that the change order is not in the "verification in progress" state, process 400 may determine whether the change order is in the "implementation" state, in an operation 412. In response to a determination that the change order is in the implementation state, the discovered configuration data may be ignored, in an operation 416. The discovered data may be ignored because the results provided by the discovered data are not yet complete and implemented. In response to a determination that the change order is not in the implementation state (for example, change order may be in the RFC state, verified state or other state), a determination may be made that no applicable change orders exist for the configuration item for which configuration data has been discovered and that any changes associated with the discovered attribute are a result of a "rogue change". In some implementations, in response to a determination that a "rogue change" has occurred, process 400 may execute a rogue change policy, in an operation 414. Processing may proceed to operation 405 after operations 416 and 414. In some implementations, the "rogue change" policy in operation 409 and 414 may be the same policy.

Figure 8:
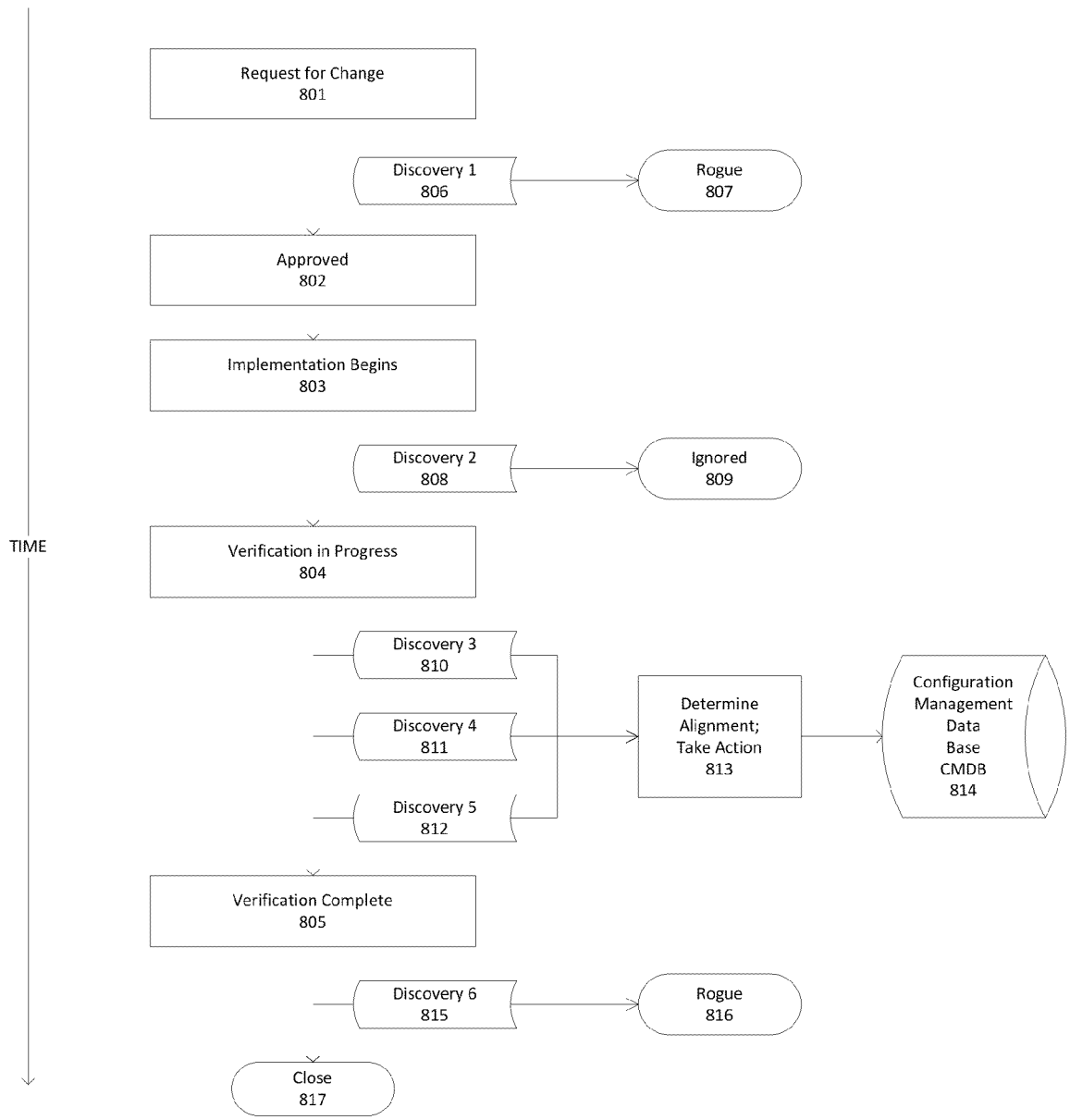
FIG. 8 illustrates how discovered configuration data is processed based on the state that a change order is in when the data is discovered, according to various aspects of the present disclosure.

In some implementations, FIG. 8 illustrates how the discovered configuration data is processed based on the state that a change order is in when the data is discovered (i.e., as the change order progresses through its lifecycle). A user may create an RFC (request for change) or change order, in an operation 801. The change order may specify the CI targets for the change as well as a set of attribute name/value pairs describing the nature of the change. If discovery of configuration data occurs at this time (when the change order is in RFC state, in operation 806, for example), any change associated with discovered attribute data (which may be detected by systems monitoring tool 120) may be considered as a rogue change (in an operation 807) because the change has not been approved. In some implementations, a rogue change verification policy may be executed and the change may not be incorporated into the configuration management database 150.

In some implementations, the change order may progress to approval pending state from the RFC state. In some implementations, the change order may be approved, in an operation 802. If discovery of configuration data occurs at this time (when the change order is approved or approval pending state, for example), any change associated with discovered attribute data may be considered as a rogue change because the approved change has not been implemented according to schedule. In some implementations, a rogue change verification policy may be executed and the changes may not be incorporated into the configuration management database 150.

In some implementations, the change order may progress to the implementation state and implementation of the change order may begin, in an operation 803. If discovery of configuration data occurs at this time (when the change order is implementation state, in an operation 802, for example), any change associated with discovered attribute data may be considered incomplete and temporarily ignored (in an operation 809) because the change is in the middle of being implemented and the final state of the CI is unknown. In some implementations, the change associated with attribute data discovered during the implementation state may be considered a rogue change. In some implementations, any change associated with attribute data discovered during the implementation state may be considered as a verified change if the attribute data matches the change order.

In some implementations, once implementation is complete, the change order may progress to the "verification in progress" state, and the verification may begin, in an operation 804. In some implementations, system monitoring tool 120 may gather discovered configuration data/transaction data associated with a plurality of discovery agents. The discovered configuration data may include changes to attribute data associated with different attributes and/or collections of configuration items. For example, discovery of configuration data associated with a first discovery agent may occur, in an operation 810; discovery of configuration data associated with a second discovery agent may occur, in an operation 811; and discovery of configuration data associated with a third discovery agent may occur, in an operation 812. If discovery of configuration data occurs when the change order is "verification in progress" state (in operations 810-812, for example), the discovered data may be evaluated to determine alignment of discovered configuration data with a change order (whether a variance exists) and an appropriate action may be taken based on a policy (in an operation 813). In some implementations, if the discovered data matches the change order, a determination may be made that the change order (i.e., changes) is verified and/or the changes are correctly performed. In some implementations, the configuration management database 150 may be updated based on the discovered data and/or change order data, in an operation 814.

In some implementations, once all verifications have been satisfied (programmatically or manually), the change order progresses to "verified" state and the verification of changes is considered complete, in an operation 805. If discovery of configuration data occurs at this time (when the change order is "verified" state, in an operation 815, for example), any change associated with discovered attribute data may be considered as a rogue change, in an operation 816. In some implementations, a rogue change verification policy may be executed and the change may not be incorporated into the configuration management database 150.

In some implementations, a change order may have multiple change specifications. The change order may sustain multiple verifications during its lifecycle. For example, three discoveries (810, 811, and 812) occur while the change order is in the "verification in progress" state, in FIG. 8. As each attribute in the discovered configuration data is processed, each of the change specifications in the change order may toggle between verified and unverified/failed depending on whether the latest discovered configuration data matches or does not match the data specified in the change order. In some implementations, the change order may be considered as satisfied (closed) when the CI simultaneously meets the requirements specified by all the change specifications contained in the change order. In other words, when all the change specifications in the change order are in a final state, the change order is considered satisfied. Thus, it is possible for the verified data to become unverified because of the latest discovery data.

For example, change order 24680 may request CI server 1 to have an IP address of 1.2.3.4 and storage of 4 GB. The table below shows an example of when the change order may be considered satisfied.

| CI | Discovered data | change order 24680 server1 ip address = 1.2.3.4 satisfied? | change order 24680 server1 storage = 4 gb satisfied? | change order 24680 satisfied? |
|---|---|---|---|---|
| discovery 1 server1 | ip address: 1.2.3.4 | Yes | No | No |
| discovery 1 server1 | storage: 1 gb | Yes | No | No |
| discovery 2 server1 | ip address: 1.1.1.1 | No | No | No |
| discovery 3 server1 | storage: 4 gb | No | Yes | No |
| discovery 4 server1 | ip address: 1.2.3.4 | Yes | Yes | Yes |

Thus, the change order 24680 may be considered satisfied only after discovery 4 (i.e., when the CI simultaneously meets the requirements specified by all the change specifications contained in the change order).

In some implementations, the table below shows another example of when the change order may be considered satisfied.

| CI | Discovered data | change order 24680 server1 ip address= 1.2.3.4 satisfied Once? | change order 24680 server1 storage = 4 gb satisfied Once? | change order 24680 satisfied? |
|---|---|---|---|---|
| discovery 1 server 1 | ip address: 1.2.3.4 | Yes | No | No |
| discovery 1 server 1 | storage: 1 gb | Yes | No | No |
| discovery 2 server 1 | ip address: 1.1.1.1 | Yes | No | No |
| discovery 3 server 1 | storage 4 gb | Yes | Yes | Yes |
| discovery 4 server 1 | ip address 1.2.3.4 | Yes | Yes | Yes |

In this implementation, when discovery 3 completes, the change order may be considered verified, even though at discovery 3, the CI has an IP address unequal to the desired address of 1.2.3.4.

Referring back to FIG. 4, in response to a determination that the change order is not in the "verification in progress" state or the "implementation" state (for example, change order may be in other states as indicated in FIG. 8), the discovered data may be processed based on the state that a change order is in when the data is discovered, as illustrated in FIG. 8.

Figure 6:
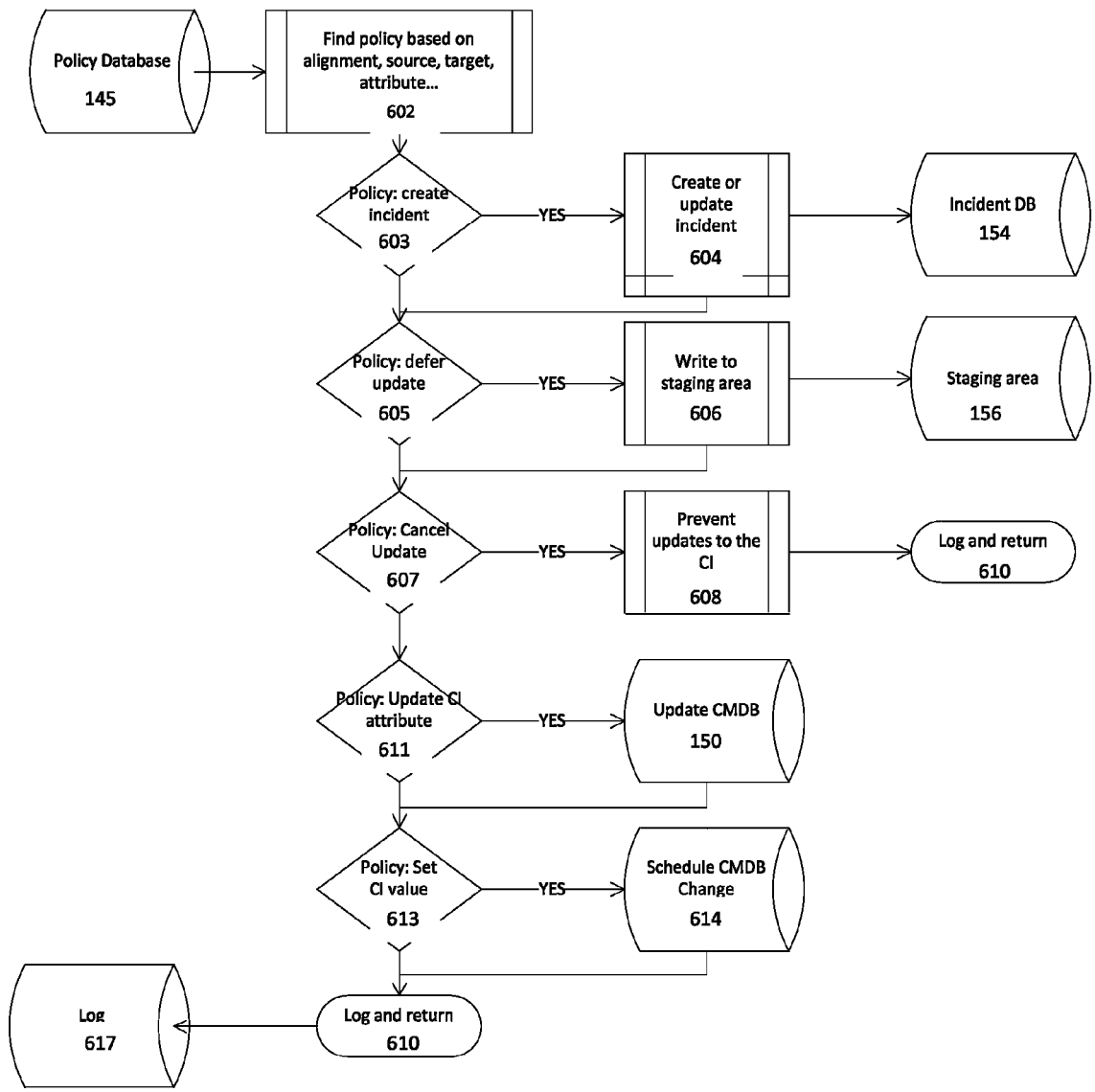
FIG. 6 illustrates how verification policies may be determined and executed, according to various aspects of the present disclosure.

FIG. 6 illustrates how verification policies are determined and executed, according to various implementations of the disclosure. In some implementations, configuration management server 130 may determine at least one verification policy to be used based on the discovered configuration data and/or the change order alignment. In some implementations, the verification policies may be used to manage any changes (e.g. attribute changes) associated with the discovered configuration data and may describe conditions for updating configuration management database 150, and/or actions to be taken whenever an update to a configuration of a configuration item in the configuration management database is attempted. When configuration data is discovered and a change order associated with the configuration data is determined, an attempt to update the configuration management database 150 with discovered configuration data (i.e., any change associated with discovered attribute data) may be made. However, the configuration management database is only updated with verified changes (i.e., when discovered attribute data that matches with desired attribute date). Any variances between the discovered configuration data and the change order are detected and managed by taking policy-based remedial actions, such that the configuration management database is not updated by any rogue changes.

In some implementations, a configuration policies database 145 may store a plurality of verification policies. Each policy may include one or more policy selection criteria that are used to determine whether the policy is to be selected. In some implementations, the policy selection criteria may include alignment criteria, source (discovery agent) criteria, attribute name, CI target criteria, and/or other criteria. In some implementations, each policy may further include update action information, policy priority information, schedule information, and/or other information.

In some implementations, the alignment criteria may indicate a situation for which the policy may be used. In some implementations, alignment criteria may include change order alignment criteria. For example, the change order alignment criteria may indicate a situation where a variance between the discovered data and the change order exists and may indicate a type of variance, for example, discovered data is a rogue change, discovered data indicates an incorrectly implemented change order, or the change order is unverifiable, etc. The change order alignment criteria may indicate a situation where the discovered data matches the change order. In some implementations, the alignment criteria may indicate a situation where a change associated with the discovered data is currently being implemented (i.e., change order is in implementation state). In some implementations, the alignment criteria may indicate a situation where the discovered data is associated with an unmanaged attribute of a configuration item. In some implementation, the alignment criteria may indicate a situation where the data associated with a new CI has been discovered.

In some implementations, the source criteria may indicate a discovery agent which performed the discovery of the configuration data. The source criteria may include source name (which may be a unique identifier identifying the discovery agent), source product name, source product instance, source userid, source authority level, source tenant, and/or other information. In some implementations, wildcards, regular expressions or other forms of value matching may be specified in the policy selection criteria for any of these source criteria.

In some implementations, the CI target criteria may include characteristics identifying the target CI. In some implementations, the CI target criteria may include CI name, CI classification (or type of object being managed, CI location, CI priority of business importance, CI SLA (service level agreement), CI tenant, and/or other information. CI target criteria may specify zero or more CI attribute name/value pairs. In some implementations, CI target criteria may include a CI filter which operates on the CI identifying characteristics to determine matching values. In some implementations, wildcards, regular expressions or other forms of value matching may be specified in the policy selection criteria for any of these CI target criteria.

In some implementations, policy priority information may be used to determine which policy is to be selected when multiple policies have satisfied the policy selection criteria. For example, user A creates a policy A that conflicts with a policy B created by user B, the policy priority information may be used to determined which single policy (policy A or policy B) is to be used.

In some implementations, update action information may include the following actions, for example, allow an update to the CI in the configuration management database if the discovered data matches the change order, allow an update to the CI in the configuration management database whether the discovered data matches the change order or not, prevent an update to the CI, reject a change/update to a single attribute, reject or cancel the entire transaction data, create an incident when a variance occurs, copy the discovered data to a tagging area to be processed at a later time, request a CI characteristic to be set to a particular value upon completion of the change order, and/or other actions.

In some implementations, schedule information may indicate when the policy is in effect. In some implementations, schedule information may include activation date, inactivation date, etc. In some implementations, schedule information may include a time of day, business holiday schedule, business hours, etc.

In some implementations, configuration management server 130 may determine at least one verification policy (to manage an attribute change, for example) based on the discovered configuration data, alignment criteria, and/or other criteria, in an operation 602. In some implementations, configuration management server may query configuration policies database 145 based on the discovered configuration data, the change order alignment (determined as discussed in FIG. 4 (example, operation 418) and FIG. 5, for example), and/or other alignment criteria associated with policy-based determinations (made in operations 403, 404, 409, 414 of FIG. 4, for example). In some implementations, configuration management server 130 may query the configuration policies database 145 to determine at least one verification policy whose policy selection criteria matches the discovered configuration data, the change order alignment and/or other policy-based determination. In other words, configuration management server 130 searches through the policies in the configuration policies database 145 to determine a policy whose policy selection criteria (for example, source criteria, CI target criteria, attribute name, and/or alignment criteria) matches the source, CI target, attribute, determined change order alignment and/or other policy-based determination associated with the discovered configuration data. In some implementations, configuration management server 130 may retrieve the determined verification policy from configuration verification policies database 145 and execute the retrieved verification policy.

In some implementations, executing the retrieved verification policy may include performing an update action specified in the retrieved verification policy. For example, if the policy indicates that an incident should be created, an incident is created in operation 604 and stored in problem management database 154. If the policy indicates that the discovered data should be written to the staging area, the data is written to the staging area in operation 606. In some implementations, the entire transaction data is copied to the staging area 156 so that the context of the change/update is preserved. To reduce duplication, the transaction data is written to the staging area once, even if multiple policies request that the data be written. In some implementations, the discovered configuration data may include multiple attributes and multiple policies may be determined to manage changes to the attributes. In this case, multiple actions may be possible after a single discovery transaction is processed. Thus, the transaction data is written to the staging area once, even if multiple policies associated with the single discovery transaction request that the data be written.

If the policy indicates that the entire transaction data should be rejected or cancelled, any changes/updates to the CI in the configuration management database 150 may be prevented, in an operation 608. Any logging activity may be backed out when the entire transaction is complete. A log 617 may record all the activity for reporting purposes, in an operation 610.

If the policy indicates that an update to the CI is allowed (in operation 611), the configuration management database 150 may be updated subject to past or future cancellations (in operation 607, for example).

If the policy indicates that a CI characteristic is to be set to a particular value, the set operation is scheduled, in an operation 614. In some implementations, the CI characteristic in the configuration management database 150 is set after the change order transitions out of the "verification in progress" state. For example, a change order may request a change to the location attribute of a CI, wherein the location is to be changed from location 1 to location 2. When the change is completed, the person responsible is "Joe", and until that point, the person responsible is "Tom". So when the change order transitions at the end of the transaction data processing, the person responsible may be set to "Joe" in the configuration management database 150.

In some implementations, the change management database 140 and the logs may be data-mined, for compliance or for quality purposes, to identify conflicting changes (where there are two conflicting change orders), volatile CIs, CIs which are frequently incorrectly updated, CIs which are frequently updated without a change order, locations which are frequently updated, incorrectly updated, or updated without authorization, requestors frequently making errors when creating change orders, and/or other information.

Figure 7:
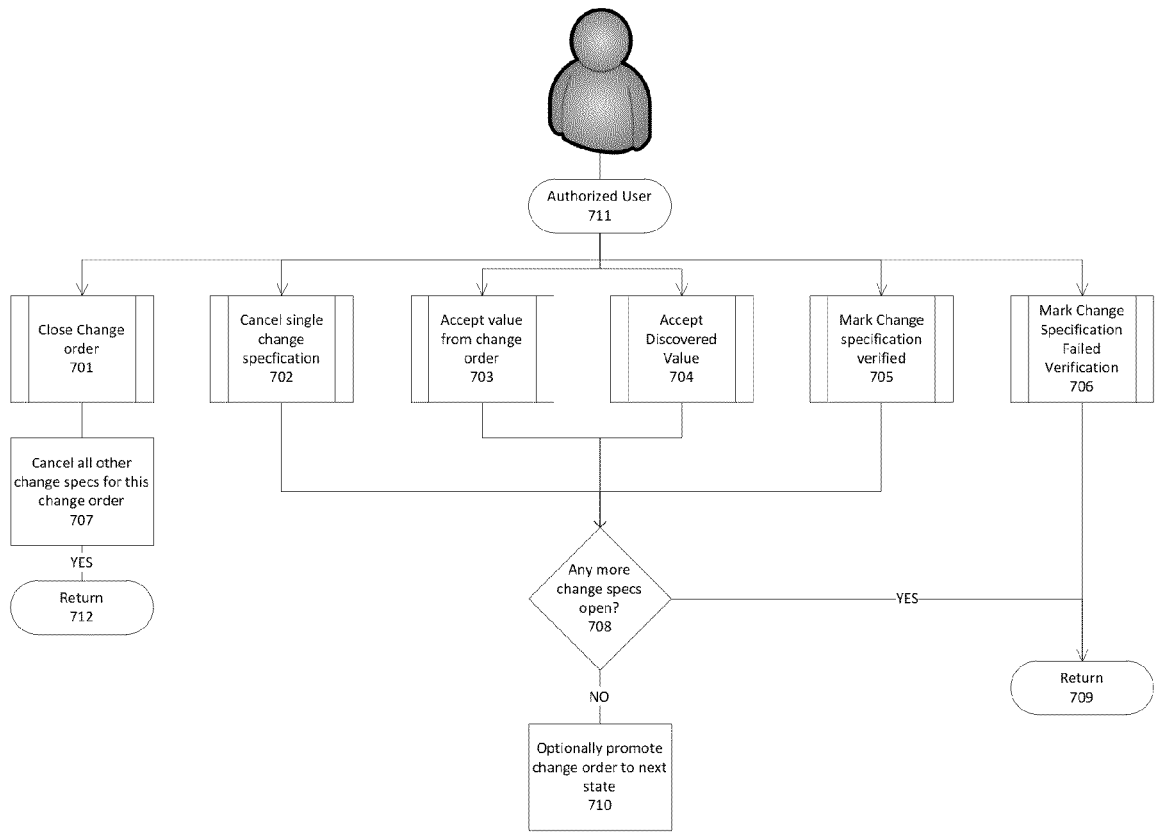
FIG. 7 illustrates scenarios where human intervention may be required, according to various aspects of the present disclosure.

FIG. 7 illustrates scenarios where human intervention may be required even though the configuration management server 130 is configured to perform human-free, error-free, programmatic verification of all changes. In some implementations, an authorized user 711 of the system may be granted to ability of modify the status of a change order and its underlying change specifications.

In some implementations, the user may completely close or cancel a change order (operation 701) or partially cancel the change order (operation 702), based on external factors beyond the control of the IT environment. For example, a change order may be deemed impossible to satisfy based on availability of components or of other resources. Perhaps another change order which was expected to be completed has not completed on time, or a shipment or task has failed and this change must be postponed. In this case, the authorized user may set the change order status to "cancelled," in operation 701. This may cause all pending change verifications to also be cancelled, in operation 707. In some implementations, the authorized user may set the change specification status to "cancelled," in operation 702. If there are no pending change specifications for this change order, the change order may optionally be promoted to the next state, in operations 708 and 710.

In some implementations, the authorized user may accept a value from the change order, in operation 703. In the event that verification has been requested for an attribute for which there is no discovery mechanism, an authorized user may manually accept the planned value. For example a change order specifies that the new owner of a server is "Joe", yet there is no way to automatically verify this, so an authorized user may "accept the planned value" and allow the change specification to be considered satisfied. If there are no pending change specifications for this change order, the change order may optionally be promoted to the next state, in operations 708 and 710.

In some implementations, the authorized user may accept a discovered value, in operation 704. In the event that the change order has been created in error, an authorized user may override the change specification and manually accept the discovered value. In other situations, a change implementor knowing the intention of the change requestor may satisfy the request in a way other than what was originally requested. For example, the requestor requests his PC to be upgraded to a 500 Gb harddrive, but there are none in stock, so the implementor installs a 750 Gb harddrive instead. In this case, this could be considered an incorrect implementation of a change, but an authorized user may "override" the original request and declare that the 750 Gb harddrive satisfies the original need. If there are no pending change specifications for this change order, the change order may optionally be promoted to the next state, in operations 708 and 710.

In some implementations, the authorized user may mark a change specification as verified, in operation 705. If the change requestor requested that the change be manually verified, an authorized user may mark that change specification as verified. For example, a change order may request that a component of a certain color be located in specific location and not be damaged. An authorized user, seeing an outstanding request for manual verification, may verify the change has been successfully completed and mark the change specification as verified. In some implementations, the authorized user may mark the change as having failed verification (in operation 706), even after it was marked as verified, if conditions warrant this.

In other instances, where discovery runs infrequently it may be useful to enable manual verification. For example, if discovery is scheduled once a day, and there is a change specification pending verification, an authorized user may decide to perform manual verification instead of waiting for the next discovery cycle. This may be beneficial when change orders are processed sequentially and one change order (and associated change specification) "blocks" the execution or verification of its succeeding change orders.

FIG. 9 illustrates an example for verifying and managing configuration item changes. The first table titled "Discovered data" depicts configuration data discovered by a discovery agent named "discoverer 1". In some implementations, the discovered configuration data may include source identification identifying the discovery agent as discoverer 1. The discovered configuration data may include data associated with a first target CI "server 1" (attribute name—disk space and attribute value—100 GB) and a second target CI "server 2" (attribute name—cost and attribute value—$1000).

In some implementations, the second table depicts the managed attribute data from managed attributes database 148. The managed attribute data may indicate which of the attributes are managed. In this case, the disk space attribute is a managed attribute. Thus, only discovered data related to disk space attribute is verified and discovered data related to cost attribute is ignored.

In some implementations, the third table depicts the policy data associated with a policy from the configuration policies database 145. The policy data may include policy selection criteria (such as source identification, target CI identification, and attribute name), update action information, and priority information.

In some implementations, the fourth table depicts the change order data from a change management database 140. The change order data includes change order id, target CI identification, attribute name, and attribute value. The change order data associated with CI "server 1" may be retrieved from change management database 140 in response to the discovery of configuration data associated with the CI (i.e., discovered data associated with "server 1" in table 1).

In some implementations, the fifth table depicts data in the configuration management database 150 before changes have been applied. The configuration management database 150 may include information about an authorized state of a configuration item (for example, prior to the changes associated with the discovered data being applied). For example, the current CMDB data associated with CI server 1 may indicate that the disk space is 10 GB, whereas the discovered data indicates that the disk space is 100 GB.

In some implementations, the sixth table depicts data in the configuration management database 150 after changes have been applied. In some implementations, a determination may be made that the "disk space" attribute is a managed attribute. In some implementations, a determination may be made that the discovered data (for example, disk space name and value) associated with the CI server 1 matches the desired data in the change order data. In some implementations, a determination may be made that the policy selection criteria associated with the policy in the third table matches the discovered configuration data, the change order alignment, and/or other criteria. In some implementations, a determination may be made that the attribute change associated with discovered data (associated with server 1) or the change order (associated with server 1) is verified and that the policy in the third table is selected to manage the attribute change. The policy may be executed wherein the action "update if matches change order" specified in the policy may be performed. Thus, the configuration associated with CI server 1 in configuration management database 150 may be updated to reflect the change in disk space as 100 GB. In some implementations, since the cost attribute is not managed, the CMDB data associated with the server 2 may be updated to $1000 without verification.

In some implementations, partial updates to the CI may be allowed. In some implementations, different verification policies may control updating different attributes of the same CI. For example, Product A is authoritative for diskspace, but not for IP address, and two policies may be created, one for each situation. If configuration data associated with Product A attempts to update diskspace in CMDB 150, the update may be allowed. Likewise, if it attempts to update IP address, the update may not be allowed. If it attempts to update both diskspace and IP address, one policy might allow the update to diskspace, while the other policy might disallow the update to IP address, thereby providing a valid partial update.

In some implementations, the operations of FIG. 4 may be independently performed for each discovered attribute in the discovered configuration data (i.e., each discovered attribute may be independently processed). Also, the operations of FIG. 4 may be repeated for a same attribute multiple times as and when data associated with the attribute is discovered by the discovery agent.

Implementations of the present disclosure may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the present disclosure.

Other embodiments, uses and advantages of the present disclosure will be apparent to those skilled in the art from consideration of the specification and practice of the present disclosure disclosed herein. The scope of the present disclosure is accordingly intended to be determined solely by the appended claims.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for managing verification of changes to a computer server, the method comprising:
   receiving discovered configuration data comprising a plurality of discovered attributes associated with the computer server, wherein the discovered configuration data is received from a discovery agent that gathers the discovered configuration data;
   determining whether a change order exists for the computer server, wherein the change order is a request for a change to a configuration of the computer server comprising a specified desired value for an attribute associated with the computer server;
   when a change order exists for the computer server, determining whether the change order is in a verification in progress state;
   when the change order is in the verification in progress state, determining whether a variance exists between a discovered attribute of the plurality of attributes of the discovered configuration data and the specified desired value of the change order;
   when a variance exists between the discovered attribute of the discovered configuration data and the change order, determining a type of the variance that exists between the discovered attribute of the discovered configuration data and the change order, wherein the type of the variance is one of a plurality of types of variances; and
   determining a verification policy of a plurality of verification policies based on the determined type of the variance, wherein the plurality of verification policies comprise operations to manage a determination of whether the change order can be moved from a verification in progress state to a verified state.

2. The method of claim 1, wherein the type of the variance comprises an incorrectly implemented change, a rogue change, or unverifiable change order,
   wherein an unverifiable change order is a change order whose specification cannot be programmatically determined.

3. The method of claim 2,
   wherein the configuration data associated with the server comprises one of a MAC address, an IP address, a disk space, a memory, a vendor, and/or a processor type.

4. The method of claim 1, further comprising:
   executing the verification policy, wherein said executing comprises performing an update action associated with the verification policy.

5. The method of claim 4, wherein the update action comprises creating an incident in a problem management database, writing the discovered configuration data to a staging area, or rejecting the discovered configuration data.

6. The method of claim 1, further comprising:
   determining whether a record associated with the the computer server exists in a configuration management database; and
   when a record associated with the computer server does not exist in the configuration management database, executing a verification policy to add new configuration data to the configuration management database.

7. The method of claim 1, further comprising:
   determining whether the discovered attribute of the plurality of attributes of the discovered configuration data is a managed attribute or an unmanaged attribute;
   when the discovered attribute is an unmanaged attribute, ignoring changes associated with the discovered attribute; and when the discovered attribute is a managed attribute, determining whether the change order exists for the computer server.

8. The method of claim 1, wherein determining a verification policy of a plurality of verification policies based on the determined type of the variance is also based on a source criteria corresponding to the discovery agent.

9. The method of claim 1, wherein determining a verification policy of a plurality of verification policies based on the determined type of the variance is also based on a policy priority information of the verification policy.

10. The method of claim 1, wherein determining a verification policy of a plurality of verification policies based on the determined type of the variance is also based on a schedule information of the verification policy indicating when the verification policy is in effect.

11. The method of claim 1, further comprising:
executing the operations of the determined verification policy to further determine whether an attribute in a configuration management database should be updated to the discovered attribute of the discovered configuration data;
moving the change order from the verification in progress state to the verified state when all desired values of the change order have been determined to match a corresponding discovered attribute of the plurality of attributes of the discovered configuration data of the computer server.

12. A system for managing verification of changes to a computer server, the system comprising:
a processor configured to:
receive discovered configuration data comprising a plurality of discovered attributes associated with the computer server, wherein the discovered configuration data is received from a discovery agent that gathers the discovered configuration data;
determine whether a change order exists for the computer server, wherein the change order is a request for a change to a configuration of the computer server comprising a specified desired value for an attribute associated with the computer server;
when a change order exists for the computer server, determine whether the change order is in a verification in progress state;
when the change order is in the verification in progress state, determine whether a variance exists between a discovered attribute of the plurality of attributes of the discovered configuration data and the specified desired value of the change order;
when a variance exists between the discovered attribute of the discovered configuration data and the change order, determine a type of the variance that exists between the discovered attribute of the discovered configuration data and the change order, wherein the type of the variance is one of a plurality of types of variances; and
determine a verification policy of a plurality of verification policies based on the determined type of the variance, wherein the plurality of verification policies comprise operations to manage a determination of whether the change order can be moved from verification in progress state to a verified state.

13. The system of claim 12, wherein the type of the variance comprises an incorrectly implemented change, a rogue change, or unverifiable change order, wherein an unverifiable change order is a change order whose specification cannot be programmatically determined.

14. The system of claim 13, wherein the configuration data associated with the server comprises one of a MAC address, an IP address, a disk space, a memory, a vendor, and/or a processor type.

15. The system of claim 12, wherein the processor is further configured to:
execute the verification policy, wherein said executing comprises performing an update action associated with the verification policy.

16. The system of claim 15, wherein the update action comprises creating an incident in a problem management database, writing the discovered configuration data to a staging area, or rejecting the discovered configuration data.

17. The system of claim 12, wherein the processor is further configured to:
determine whether a record associated with the computer server exists in a configuration management database; and
when a record associated with the computer server does not exist in the configuration management database, execute a verification policy to add new configuration data to the configuration management database.

18. The system of claim 12, wherein the processor is further configured to:
determine whether the discovered attribute of the plurality of attributes of the discovered configuration data is a managed attribute or an unmanaged attribute:
when the discovered attribute is an unmanaged attribute, ignore changes associated with the discovered attribute; and
when the discovered attribute is a managed attribute, determine whether the change order exists for the computer server.

19. The system of claim 12, where the processor:
executes the operations of the determined verification policy to further determine whether an attribute in a configuration management database should be updated to the discovered attribute of the discovered configuration data;
moves the change order from the verification in progress state to the verified state when all desired values of the change order have been determined to match a corresponding discovered attribute of the plurality of attributes of the discovered configuration data of the computer server.

20. A method for managing verification of changes to a computer server, the method comprising:
obtaining a plurality of change orders comprising requests to change attributes of individual ones of a plurality of computer servers to a desired value;
obtaining a plurality of verification policies comprising operations which can be executed to update a state of a change order to indicate whether a change requested in the change order has been verified;
obtaining a first discovered attribute of a first computer server from a discovery agent that gathers configuration data from the plurality of computer servers;
responsive to receiving the first discovered attribute of the first computer server, determining that a type of the first discovered attribute is managed in a configuration management database, wherein the configuration management database stores a plurality of attributes associated with individual ones of the plurality of computer servers;
responsive to determining that the first discovered attribute is managed in the configuration management database, determining whether a first change order exists for the first computer server which is in a state ready for verification;

responsive to determining that the first change order exists for the first computer server, determining whether the first discovered attribute matches a first desired attribute of the first change order by comparing the type of the first discovered attribute to a type of the first desired attribute and by comparing a value of the first discovered attribute to a value of the first desired attribute;

responsive to determining that the type of the first discovered attribute matches the type of the first desired attribute and that the value of the first discovered attribute matches the value of the first desired attribute, determining whether a verification policy of the plurality of verification policies exists to verify the first desired attribute of the first change order;

responsive to determining that the verification policy exists, executing operations of the verification policy to update a value for the attribute in the configuration management database to the first desired attribute, and marking the first change order as verified.

21. The method of claim 20, further comprising the steps of;

obtaining a second discovered attribute of the first computer server from the discovery agent that gathers configuration data from the plurality of computer servers;

responsive to receiving the second discovered attribute of the first computer server, determining that a type of the second discovered attribute is managed in the configuration management database;

responsive to determining that the second discovered attribute is managed in the configuration management database, determining whether a second change order for the first computer server exists which is in a state ready for verification;

responsive to determining that the second change order exists for the first computer server, determining whether the second discovered attribute matches a second desired attribute of the second change order by comparing the type of the second discovered attribute to a type of the second desired attribute and by comparing a value of the second discovered attribute with a value of the second desired attribute;

responsive to determining that the type of the second discovered attribute matches the type of the second desired attribute and that the value of the second discovered attribute does not match the value of the second desired attribute, determining whether a verification policy of the plurality of verification policies exists for incorrectly implemented changes;

responsive to determining that the verification policy exists for incorrectly implemented changes, executing operations of the verification policy for incorrectly implemented changes and not updating the configuration management database.

22. The method of claim 21, further comprising the steps of:

obtaining a third discovered attribute of the first computer server from the discovery agent that gathers configuration data from the plurality of computer servers;

responsive to receiving the third discovered attribute of the first computer server, determining that a type of the third discovered attribute is managed in the configuration management database;

responsive to determining that the third discovered attribute is managed in the configuration management database, determining whether a third change order exists for the first computer server which is in a state ready for verification;

responsive to determining that the third change order exists for the first computer server, determining whether the third change order can be programmatically converted into pairs comprising an. attribute name and attribute value;

responsive to determining that the third change order cannot be programmatically converted into pairs comprising an attribute name and attribute value, designating the change order as unverifiable.

23. The method of claim 22, further comprising the steps of:

obtaining a fourth discovered attribute of the first computer server from the discovery agent that gathers configuration data from the plurality of computer servers;

responsive to receiving the fourth discovered attribute of the first computer server, determining that a type of the fourth discovered attribute is managed in the configuration management database;

responsive to determining that the fourth discovered attribute is managed in the configuration management database, determining whether a fourth change order exists for the first computer server which is in a state ready for verification;

responsive to determining that the fourth change order does not exist for the first computer server, determining whether a verification policy of the plurality of verification policies exists for rogue changes, wherein a rogue change is a change to a computer server which has not been requested;

responsive to determining that the verification policy for rogue changes exists, executing operations of the verification policy for rogue changes and not updating the configuration management database.

* * * * *